United States Patent Office 3,544,506
Patented Dec. 1, 1970

3,544,506
BORON CONTAINING COATING COMPOSITIONS
James Patrick Dowd, 5300 Sunrise St.,
Houston, Tex. 77021
No Drawing. Filed Feb. 9, 1968, Ser. No. 704,252
Int. Cl. C08g 51/04, 47/00
U.S. Cl. 260—37                                        10 Claims

ABSTRACT OF THE DISCLOSURE

Heat resistant protective and decorative coatings can be produced with the reaction products of phenyltrichlorosilane and vinyl or allyl carborane. The use of alkyl titanates with these products is shown to enhance the heat resistance of the resultant coatings.

---

This invention relates to new and improved heat resistant coating compositions. More particularly this invention relates to coatings composed of vinyl or allyl carborane and phenyltrichlorosilane either alone or in combination with an organic titanium ester. These products are distinct from silicone resins which have been advocated and used in heat resistant finishes for many years. Silicone resin systems suffer from a number of defects. It is necessary to cure these coatings at elevated temperature for many hours before they become hard and abrasion resistant. In addition, silicone resins produced, according to prior art, slowly volatilize at temperatures in excess of 400° C. leaving only an unsubstantial residue. Prior art teaches the use of fusible pigments in combination with silicone resins. The pigments may be either ceramic or metallic in composition. When the silicone resin evaporates the pigments fuse to form a film. This limits the choice of pigments which can be used to those which are capable of fusing at the temperature to which the coating will be exposed. It is an object of this invention to provide a coating which will dry at ambient temperatures to a continuous chemical resistant film, said film stable within a temperature range of 20°–600° C. It is a further object of this invention to provide a film which does not depend on fusible pigments for film formation within the ranges of 300°–600° C. It is a further object of the present invention to solve the problems of satisfactorily overcoating zinc containing primers. Zinc primers provide excellent corrosion protection to ferrous substrates. However, at temperatures over 400° C. in the presence of air, the zinc rapidly oxidizes. The use of conventional silicone topcoats have been advocated as sealers to protect the zinc from coming in contact with air. Conventional silicone topcoats have a tendency to lose adhesion and peel off the zinc primer substrate because of the poor alkali resistance of the silicone topcoats. The present invention provides an alkali resistant topcoat capable of adhering to and protecting a zinc pigmented primer.

In the practice of the present invention a reaction product of phenyltrichlorosilane and vinyl carborane is prepared. In order to react vinyl carborane with phenyltrichlorosilane, the lithium adduct of vinyl carborane is first prepared. This is accomplished by first reacting the vinyl carborane with butyl lithium. By carborane is meant a compound having the general formula RR'C$_2$B$_{10}$H$_{10}$ arranged in an icosahedral cage type structure where R and R' are substituent groups representing allyl or vinyl groups on the two carbon atoms. If the apex atom of the icosahedron is designated as 1 and atoms on the adjacent belts are numbered consecutively in a clockwise direction, then the substituent unsaturated groups referred to in this invention are in the "1" position. Thus the empirical formula of 1 vinyl carborane is

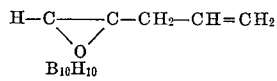

1 allyl carborane is

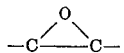

O is used here as a symbol designating an icosahedral cage structure.

In the process of carrying out my invention I proceed as follows: 1 mol of allyl carborane is reacted with butyl lithium. This reaction is conducted in a closed vessel under anhydrous conditions because of the reactivity of butyl lithium with water and water vapor normally present in air. Between 13 and 39 mols of phenyltrichlorosilane is then added and refluxed under heat for sufficient time to cause the reaction to occur. The mixture is then hydrolyzed by slowly adding water. The resulting product which is the vehicle is washed to remove the hydrochloric acid which results from the hydrolysis of the chlor silane-vinyl carborane reaction product. An organic titanate may be added to polymers made from allyl carborane and preferably to those made with vinyl carborane. The addition of from 1 to 8 mols of an organic titanate results when deposited on a surface in a coating which dries at ambient temperatures to a hard glossy film. The liquid mixtures of organic titanates with the carborane silicone polymers of this invention are stable, since after six months storage, no gelling or precipitation was observed.

It has been found particularly advantageous in the practice of the present invention to apply two coats of pigmented polymer. The first coat may be pigmented with zinc powder or zinc flake in an amount roughly equal to the amount of resin solids in the vehicle. This results in better adhesion of the topcoat. The topcoat may be pigmented with a color bearing pigment. In the event that the topcoat becomes inadvertently damaged some corrosion resistance is provided by the zinc primer.

EXAMPLE I

This example illustrates the preparation of a vehicle which is used to prepare heat resistant coatings. This vehicle has a mol ratio of phenyltrichlorosilane to vinyl carborane of 13:1

Ingredients:                                        Parts by wt.
  Vinyl carborane _____  2.0
  Xylene _____ 15.0
  A solution of butyl lithium in normal hexane
    (20% butyl lithium by weight) _____ 18.5
  Phenyltrichlorosilane _____  4.8
  Water _____ 10.0
  Tetra N-butyl titanate _____  1.0

The vinyl carborane was dissolved in the xylene, and charged into a flask equipped with a stirrer, water cooled condenser, addition funnel and electric heating mantle. The flask was heated until refluxing had begun. Then the butyl lithium solution was added via the addition funnel. Refluxing was continued for two hours the phenyltrichlorosilane was then added and the mixture heated to reflux. The mixture was then allowed to cool to 35° C. The water was slowly added. The contents of the flask were transferred to a 25 ml. separatory funnel. The aqueous lower layer was separated and discarded. The organic solvent layer was extracted with 10 ml. increments of water until the pH of the wash water was 7.0. The tetra-butyl titanate was added. The mixture consisting of a solution of the resin in organic solvent was heated until enough solvent had evaporated to produce a resin solution containing 15% by weight of resin. This solution had good stability. There was no change in viscosity or other symptoms of gellation after being stored at ambient temperature for six months. Films cast from this solution are air dried to hard clear coatings having excellent acid and alkali resistance.

EXAMPLE II

This illustrates the preparation of a heat resistant vehicle having a mol ratio of phenyltrichlorosilane to vinyl carborane of 19:1.

| Ingredients: | Parts by wt. |
|---|---|
| Vinyl carborane | 2.0 |
| Xylene | 15.0 |
| Butyl lithium solution (20% by weight dissolved in normal hexane) | 18.5 |
| Phenyltrichlorosilane | 7.2 |
| Water | 10.0 |
| Tetra n-butyl titanate | 3.0 |

This vehicle was prepared in a flask equipped with a condenser, agitator, electric heating mantle and addition funnel. The vinyl carborane was dissolved in the xylene. It was then charged into the flask and heated to reflux. The butyl lithium solution was then slowly added. The flask was maintained at reflux temperature for two hours. The phenyltrichlorosilane was added and the refluxing continued for three hours. It was then allowed to cool to room temperature and the water was slowly added. The contents of the flask was transferred to a separatory funnel and the lower aqueous layer was separated from the resin containing solvent layer. The resin solution was washed with tap water until the washings were neutral. The tetrabutyl titanate was then added. This material was applied to cold rolled steel panels. It dried within one hour to a clear amber colored film. The dried film was tested for chemical resistance by allowing droplets of 10% sodium hydroxide and 10% sulfuric to come in contact for twenty four hours. No evidence of blistering, whitening, softening or other signs of deterioration was observed.

EXAMPLE III

This vehicle is prepared from 26 mols of phenyltrichlorosilane and 1 mol of vinyl carborane.

| Ingredients: | Parts by wt. |
|---|---|
| Vinyl carborane | 2.0 |
| Xylene | 15.0 |
| Butyl lithium solution (20% by weight dissolved in n-hexane) | 18.5 |
| Phenyltrichlorosilane | 9.6 |
| Water | 10.0 |
| Tetra n-butyl titanate | 4.0 |

The vinyl carborane was dissolved in the xylene and charged into a 100 ml. flask equipped with a water cooled condenser, stirrer, addition funnel and heating mantle. The mixture was heated to boiling. The butyl lithium solution was slowly added. The mixture was allowed to reflux for three hours. The phenyltrichlorosilane was added and the refluxing continued for 3 hours. The contents of the flask was cooled to 25° C. The water was added slowly in 1 drop increments. The contents of the flask was transferred to a separatory funnel. The aqueous lower layer was separated and discarded. The hydrocarbon layer was washed with 10 ml. of distilled water and the washings were discarded. The procedure was repeated with 10 ml. of 10% aqueous sodium carbonate solution. The hydrocarbon layer was evaporated on a hotplate to about 50% of its original volume. The tetrabutyl titanate was added. A film was applied to a clean steel panel and allowed to dry. It was tested for acid and alkali resistance by placing droplets of 10% aqueous sulfuric acid and 10% aqueous sodium hydroxide on its surface and allowing them to remain there for twenty four hours. No whitening, blistering or other signs of deterioration could be seen where the chemical reagents had been in contact with the film.

EXAMPLE IV

This example illustrates the preparation of a heat resistant vehicle in which the mol ratio of phenyltrichlorosilane to vinyl carborane is 31:1.

| Ingredients: | Parts by wt. |
|---|---|
| Vinyl carborane | 2.0 |
| Xylene | 15.0 |
| Butyl lithium solution (20% by weight dissolved in n-hexane) | 18.5 |
| Phenyltrichlorosilane | 12.0 |
| Water | 12.0 |
| Tetrabutyl titanate | 5.0 |

The vinyl carborane was dissolved in the xylene and charged into a 100 ml. flask equipped with a water cooled condenser, stirrer, addition funnel and heating mantle. The mixture was heated to boiling and then the butyl lithium solution was added. The mixture was refluxed for 2 hours and then the phenyltrichlorosilane was added. The refluxing was continued three hours. It was then allowed to cool to 35° C. The water was slowly added in dropwise increments. The water layer was separated from the solvent layer and discarded. The solvent layer containing the desired reaction product was washed with a 10% aqueous solution of sodium carbonate which was then discarded. The mixture was allowed to remain undisturbed for 24 hours and was then centrifuged to remove suspended water droplets. The tetrabutyl titanate was added and mixed thoroughly.

EXAMPLE V

This example illustrates the preparation of a heat resistant vehicle having a mol ratio of phenyltrichlorosilane to vinyl carborane of 39:1.

| | Grams |
|---|---|
| Vinyl carborane | 2.0 |
| Xylene | 15.0 |
| Butyl lithium | 18.5 |
| Phenyltrichlorosilane | 14.4 |
| Tetrabutyl titanate | 6.0 |

The vinyl carborane was dissolved in the xylene and heated to boiling in a flask equipped with a stirrer, water cooled condenser, electric heating mantle and an addition funnel. The butyl lithium solution was slowly added and the refluxing continued for three hours. It was allowed to cool to room temperature and the water was added in dropwise increments. The contents of the flask was transferred to a separatory funnel. The lower aqueous layer was removed and discarded. The hydrocarbon layer was washed with an equal volume of 10% aqueous sodium carbonate solution and allowed to remain undisturbed for 24 hours. The mixture was then centrifuged to remove suspended aqueous droplets. The tetrabutyl titanate was added and the mixture was heated for 1 hour at 70° C.

EXAMPLE VI

This example illustrates the use of allyl carborane in compositions of this invention.

| Ingredients: | Parts by wt. |
|---|---|
| Allyl carborane | 1.84 |
| Butyl lithium solution (22% dissolved in normal hexane) | 4.20 |
| Phenyltrichlorosilane | 1.05 |
| Water | 5.00 |

The allyl carborane was dissolved in 25 milliliters of xylene and charged into a 100 ml. flask equipped with a water cooled condenser, stirrer, electric heating mantle and addition funnel. The mixture was heated to boiling and the butyl lithium solution was added. After allowing the mixture to reflux for 2 hours, the phenyltrichlorosilane was added. The mixture was allowed to reflux for two hours. The contents of the flask was cooled to 35° C. The water was slowly added. The mixture was refluxed for two hours. The contents of the flask was transferred to a separatory funnel. The heavy aqueous layer was separated from the hydrocarbon layer and discarded. 10 ml. of aqueous 10% sodium carbonate was added to the hydrocarbon layer and mixed thoroughly. The mixture was allowed to stand for twenty-four hours. The aqueous sodium carbonate was removed and discarded. The hydrocarbon layer (containing the desired resin) was evaporated until it contained 20% by weight of the resin solids. This vehicle dried to produce a clear dark amber colored film.

EXAMPLE VII

Preparation of metallic pigmented coating compositions

| | Parts by wt. |
|---|---|
| Vehicle composition described in Example III | 1.0 |
| Zinc powder (12 micron average particle size) | 2.0 |

The zinc powder was stirred into the vehicle until a uniform mixture was obtained. This mixture was found to be suitable for use as a primer to be applied to a white sandblasted steel substrate and overcoated with any of the enamels described in Table I.

EXAMPLE VIII

| | Parts by wt. |
|---|---|
| Vehicle of Example VI | 1.0 |
| Flaked Zinc (surface area of 1.1 square meter per gram) | 0.4 |

The vehicle was slowly added to the flaked zinc and stirred until a uniform mixture was obtained. It was found that flaked zinc had better adhesion in the 400–500° C. region than regular zinc powder.

PREPARATION OF NONMETALLIC PIGMENTED COATING COMPOSITIONS

The vehicle compositions described in this invention may be pigmented by dispersing into them pigments having superior heat and chemical resistance. Methods of dispersing pigments are numerous and have been thoroughly taught and understood by the prior art. Examples of nonmetallic pigmented carborane coating compositions are set out in Table I.

After being subjected to this cycle, the test panel was examined. The coating was found to be intact and to have excellent adhesion to the metal substrate. There was no rusting or blistering or any sign of deterioration.

While there have been described herein what are at present considered to be preferred embodiments of the invention, it will be obvious to those skilled in the art that minor modifications and changes can be made without departing from the essence of the invention.

What is claimed is:

1. The method of producing a heat resistant vehicle which process comprises:
    (a) reacting between 13 and 39 mols of phenyltrichlorosilane with one mol of the lithium adduct of vinyl carborane or allyl carborane and mixtures of the foregoing at 135° C. to 145° C. and subsequently hydrolyzing with water,
    (b) blending said composition with between 1.0 and 8.0 mols of a monomer selected from the groups consisting of tetra normal butyl titanate, isopropyl titanate, methyl titanate, titanium acetylacetonate and phenyl titanate.

2. The heat resistant protective and decorative coating material comprising a pigment selected from the group consisting of the chromium oxide, titanium dioxide and cobalt aluminate and the resinous vehicle produced by the process of claim 1.

3. A coating material as claimed in claim 2 having as a pigment flake zinc.

4. A coating material as claimed in claim 3 employing fibrous potassium titanate as an extender pigment.

5. A coating material as claimed in claim 3 having as a pigment aluminum flake.

6. The method of producing a heat resistant vehicle composition which process comprises: reacting between 13 and 39 mols of phenyltrichlorosilane with 1 mol of the lithium adduct of vinyl carborane or allyl carborane at 135° C. to 145° C. and subsequently hydrolyzing with water.

7. The heat resistant protective coating material comprising a pigment selected from the group consisting of chromium oxide, titanium dioxide and cobalt aluminate

TABLE I

| Example | Color | Color pigment | Extender pigment | Parts by weight Extender | Color pigment | Example No. of vehicle component | Parts by weight vehicle |
|---|---|---|---|---|---|---|---|
| IX | Green | Chromium oxide green | | | 0.2 | III | 1.00 |
| X | do | Chromium oxide | Potassium titanate | .01 | 0.2 | III | 1.00 |
| XI | do | do | do | | 0.2 | II | 1.00 |
| XII | do | do | do | .01 | 0.2 | I | 1.00 |
| XIII | do | do | do | .01 | 0.3 | V | 1.00 |
| XIV | Blue | Cobalt aluminate | do | | 0.3 | VI | 1.00 |
| XV | do | do | do | .01 | 0.2 | III | 1.00 |
| XVI | White | Titanium dioxide | do | .01 | 0.15 | IV | 1.00 |

EXAMPLE XVII

A mild steel panel ¾″ x 3″ x ⅛″ was sandblasted to a white metal surface. The flake zinc primer of Example VIII was applied with an artists brush, and allowed to dry for thirty minutes. A second coat consisting of the enamel of Example XV was then applied and allowed to dry for thirty minutes. The total coating thickness was measured with a "Mikrotest" magnetic thickness gauge and found to be .0005 inch thick. The coating was hard and abrasion resistant. The coated panel was then exposed to the following test cycle:

(1) 5 hours in an electric muffle furnace at 400° C.
(2) Immediate quenching in 3% sodium chloride in water solution where it remained for 24 hours.
(3) 5 hours at 500° C. followed by quenching in 3% sodium chloride water solution and exposure there for 24 hours.
(4) 5 hours at 600° C. followed by quenching in 3% aqueous sodium chloride solution where it remained for 24 hours.

and the resinous vehicle produced by the process of claim 6.

8. A coating material as claimed in claim 4 having as a pigment aluminum flake.

9. A coating material as claimed in claim 4 having fibrous potassium titanate as a pigment.

10. A coating material as claimed in claim 7, having as a pigment flake zinc.

References Cited

UNITED STATES PATENTS

| | | | |
|---|---|---|---|
| 3,431,234 | 3/1969 | Fein et al. | 260—46.5(E) |
| 3,440,260 | 4/1969 | Mayes | 260—46.5(E) |
| 3,397,221 | 8/1968 | Papetti | 260—46.5(E)X |
| 3,442,824 | 5/1969 | Chandler | 260—46.5(E)X |

MORRIS LIEBMAN, Primary Examiner

L. T. JACOBS, Assistant Examiner

U.S. Cl. X.R.

260—824